United States Patent Office 2,858,300
Patented Oct. 28, 1958

2,858,300

SULFATION OF PROTEINS

Ralph W. Kerr, Riverside, Ill., assignor to Corn Products Refining Company, New York, N. Y., a corporation of New Jersey No Drawing. Application April 14, 1955
Serial No. 501,431

8 Claims. (Cl. 260—112)

This invention relates to the sulfation of proteinaceous materials and more particularly to sulfation of native proteins, such as zein, casein, and soy alpha-protein.

An object of this invention is to provide a method for sulfating proteins, particularly native proteins, such as zein, casein, soy alpha-protein. Another object is to provide a method for the sulfation of protein bearing materials, such as, for example, the residue remaining from corn gluten after the alcoholic extraction therefrom of zein, which contains, in addition to zeanin, starch, and possibly other corn proteins, minor amounts of pentosans, hemicellulose, cellulose and other substances. Another object is to sulfate protein without degrading them. A further object is to react proteins and protein degradation products with the addition products of $SO_3$ and tertiary amines. Still a further object is to accomplish this result in aqueous medium or semi-dry medium without the use of organic solvents. Yet another object of this invention is the production of novel protein products with improved properties, such as greatly increased solubility in particular solvents. Other objects will appear hereinafter.

The prior art contains relatively few references to the sulfation of proteins compared, for example, to the sulfation of polysaccharides and other carbohydrates. Reitz et al. (J. Am. Chem. Soc. 68, 1024 (1946)) claimed to have sulfated native proteins, such as gliaden, zein, and casein, by suspending and stirring the native protein, prewet with absolute alcohol, in concentrated sulfuric acid at $-34°$ C. By analysis of these proteins for hydroxyl groups and by comparison of the amount of sulfur introduced, these workers showed that sulfation with $H_2SO_4$ was limited to OH groups. That is, sulfate esters were formed and $H_2SO_4$ did not react with amine, amide and other nitrogenous groups to form sulfamates. Indirect evidence was given to support this conclusion by preparing sulfate esters by the same method, using the amino acids, serine, threonine and hydroxyproline.

Reitz et al. (J. Am. Chem. Soc. 68, 1031 (1946)) were able to introduce a much larger percentage of sulfur into native proteins by treating them with a mixture of 183 ml. pyridine and 33 ml. of chlorosulfonic acid, using 20 ml. of this mixture per gram of protein. Contents of sulfur as high as 8.8 percent sulfur were obtained with wheat gluten. From this study, Reitz et al. concluded that in native proteins, in addition to sulfation of OH groups, there is sulfamate formation with amino and particularly amide groups (as in gliadin, particularly) as well as guanidyl and indole groups, using the last described method. Furthermore, it was believed that phenolic hydroxyls were sulfonated but that carboxyl and imidazol groups as well as peptide linkages were unreactive to chlorosulfonic acid in pyridine.

Reitz has patented (U. S. Patent 2,344,267 (1944)) the sulfation of wheat gluten and other prolamines by reacting them with chlorosulfonic acid in a tertiary amine.

I have discovered that proteins may be sulfated readily by means of compounds of tertiary amines and sulfur trioxide. Moreover, I have found that sulfation by means of these compounds may be effected in alkaline aqueous media. The term sulfation, as used herein, is intended to mean the reaction of a functional group or groups in the proteinaceous material, such as, for example, hydroxyl, phenolic group, amide or amine, with tertiary amine sulfur trioxide compound to form a compound, such as, for example, a sulfuric acid ester, a sulfonate group, or a sulfamic acid derivative.

In carrying out the invention, the simplest method is simply to suspend or dissolve the protein in an aqueous alkaline medium, such as dilute sodium hydroxide solution, and then preferably after warming the resultant suspension or solution, add the tertiary amine sulfur trioxide compound. The pH of the system should preferably be maintained above about 7 during the reaction. After the sulfation has proceeded to the desired degree, the system is neutralized and the sulfated product recovered, for example, by precipitation by addition of a substantially neutral electrolyte, such as sodium sulfate.

The sulfated products may be further purified, when desired, by any of the well known methods, such as, for example, use of selective solvents, dialysis (where the proteinaceous sulfate is not able to pass the membrane), by electrolysis or by precipitation as an insoluble salt.

Any tertiary amine sulfur trioxide compound may be used as the sulfating agent. The preferred tertiary amine sulfur trioxide compounds are the trimethylamine and triethylamine sulfur trioxides, although other trialkyl amine sulfur trioxides, such as dimethyl benzylamine, dimethyl ethylamine, diethyl methylamine, and tripropylamine sulfur trioxides also give satisfactory results.

Among the cyclic and heterocyclic tertiary amine sulfur trioxide compounds which give satisfactory results are N-ethylpiperidine, N-ethylmorpholine, dimethylcyclohexylamine, pyridine, and the like.

The character of the product will depend primarily upon the nature of the protein substrate and the degree of sulfation. The degree of sulfation, up to the limit of sulfation of a particular protein body, is controlled primarily by the ratio of sulfating agent to protein. For example, products have been prepared from zein which contain as high as 7.5 percent sulfur, by adding 0.4 mole of crystalline $(CH_3)_3N \cdot SO_3$ per 100 grams protein to the reaction medium. Of next importance is the ratio of alkali to tertiary amine sulfur trioxide compound. The addition of a strong, soluble alkali promotes the sulfation reaction. For efficient use of sulfating agent, at least one and one-half molar equivalents of an alkali hydroxide is desirable for each molar equivalent of the sulfur trioxide compound added. A preferred range is 2 to 4 molar equivalents of alkali to one of amine sulfur trioxide compound. The alkali may be added in small portions as the reaction proceeds where alkaline modification of the protein is to be avoided. However, for most effective use of sulfating agent, the reaction medium should always have a reaction pH greater than 7. Sodium hydroxide is the preferred reagent because of its low cost and its base strength, although other hydroxides, such as, for example, KOH or organic bases, such as the quaternary ammonium hydroxides, may be employed. A limitation on the use of high alkalinities to promote the sulfation is imposed, of course, in cases where an undue alkaline modification and/or hydrolysis of the protein is to be avoided. In instances where, in production of a desired type of product, an alkaline modification of protein is to be provided, as in the case of modified zein, alkaline modification may be accomplished simultaneously with sulfation by using appropriate amounts of alkali and appropriate temperatures and time.

Use of higher temperatures promotes the sulfation. Here again, however, and depending on the alkalinity, temperatures higher than about 40° C. to 65° C. promote unduly changes in the protein, such as denaturation or alkaline modification and even hydrolysis, particularly of amide groups.

The time required to complete the sulfation will depend upon the variables already mentioned: molar equivalents of sulfating agent used, alkalinity and temperature. Thus, for example, when 0.4 mole of $(CH_3)_3N.SO_3$ was added per 100 grams of zein, using a molar ratio of 4 parts NaOH to one of amine sulfur trioxide compound (Example 1), the reaction was approximately 90 percent complete (sulfation efficiency, 90 percent) in 1.5 hours at temperatures not higher than 60° C. (Based on percent sulfur added to protein as amine sulfur trioxide composed and percent sulfer actually found in sulfated product.)

By choice of conditions, as outlined above, sulfated proteins or proteinaceous material, may be obtained with sulfur contents of 0.1 to about 8 percent more than the sulfur content of the original protein. At lower sulfur contents and with milder sulfating conditions (such as lower alkalinities, temperatures, and reaction times) some protein sulfates, particularly the prolamines which are originally insoluble in water, now swell when placed in water, taking up large amounts of water, and produce hydrogels. These protein sulfate hydrogels are useful in applications where are now employed hydrogels of conventional materials, such as the natural gums, agar, gelatin, and the like. Moreover, these protein sulfate hydrogels, containing a substituted sulfuric acid group are more readily stabilized, as by cross-linking, by the addition of a multivalent ion, such as aluminum, iron, tin, calcium, and the like, or by a bifunctional esterifying agent, as well as by the orthodox methods of cross-linking the conventional types of hydrogels (e. g. gelatin), such as by the addition of aldehydes and chrome alum.

At higher sulfur contents the sulfated proteins form clear, viscous hydrosols in water, and, in some instances, in water plus miscible solvents, such as alcohols and ketones. Accordingly, these products may be used as emulsifying, suspending and thickening agents as well as sizing agents in many textile and paper applications.

At the highest sulfur contents, and particularly with the more strenuous reaction conditions imposed, the sulfated proteins dissolve in water to form clear, low viscosity sols which when applied to surfaces form films on drying, or when applied to two surfaces in contact, show excellent adhesive properties. Salts of these sulfated proteins, such as the sodium salt, for example, or some of the amine or quaternary ammonium salts, are pronounced foaming agents in aqueous media and are useful as foam producers and stabilizers and frothing agents in detergents and in flotation systems.

The following examples which are typical will further illustrate the invention. However, they are intended as illustrative only and do not in any way limit the invention.

EXAMPLE 1

*Sulfation of zein in aqueous alkali with crystalline trimethylamine sulfur trioxide*

Eight grams of commercial zein (containing 6.61 percent moisture and 0.73 percent sulfur) was stirred into 100 ml. of N sodium hydroxide. The mixture was heated with stirring to 60° C. over a period of 30 minutes during which time 3.5 grams of the crystalline addition product, trimethylamine sulfur trioxide, was added. The reaction mixture was allowed to cool to room temperature over a period of one hour, with stirring. A clear solution formed at a pH of 11.8.

The solution was adjusted to pH 8 by the addition of 46.3 ml. of N sulfuric acid. The colloidal mass was extensively dialyzed against deionized water and the clear solution was concentrated under reduced pressure at 30° C. and then lyophilized to dryness.

Yield was 10.55 grams at 4.15 percent moisture. Sulfur content was 7.16 percent, dry basis.

EXAMPLE 2

*Sulfation of zein in aqueous alkali with crystalline triethylamine sulfur trioxide*

Eight grams of commercial zein was sulfated in 100 ml. of N sodium hydroxide with 4.5 grams of crystalline triethylamine sulfur trioxide according to procedures outlined in Example 1.

After dialyzing and drying the clear solution, the resulting product was found to contain 2.25 percent sulfur, dry basis.

EXAMPLE 3

*Sulfation of casein in aqueous alkali with crystalline trimethylamine sulfur trioxide*

Eight grams of commercial casein (containing 7.45 percent moisture and 0.40 percent sulfur) was suspended with stirring in 100 ml. of 0.5 N sodium hydroxide. The mixture was heated with stirring to 55° C. during which time 3.5 grams of crystalline trimethylamine sulfur trioxide was added in small portions. The solution was cooled to room temperature and stirred 2 hours. At this time the solution had a pH of 9.3 which was adjusted to pH 7.6, using one ml. of N hydrochloric acid.

The liquors were dialyzed extensively against deionized water, concentrated under reduced pressure at 30° C. and lyophilized to dryness.

Weight of product was 8.55 grams at 9.46 percent moisture content. This product contained 3.39 percent sulfur, dry basis.

EXAMPLE 4

*Sulfation of casein followed by precipitation of product for drying*

Commercial casein was sulfated in accordance with procedures given in Example 3. After adjusting the reaction mixture to pH 7.6, however, 20 grams of sodium sulfate was added, whereupon the casein sulfate precipitated. The gummy-like product was passed between cold rollers to form a sheet which was dried and then ground to a coarse powder.

This product dissolved readily in cold water and in a 50 percent by volume mixture of water and methanol.

EXAMPLE 5

*Sulfation of soy alpha-protein with crystalline pyridine sulfur trioxide*

Eight grams of commercial, soy alpha-protein was stirred into 100 ml. of 0.5 N sodium hydroxide. The soy alpha-protein sample contained 9.07 percent moisture and 1.16 percent sulfur, dry basis. The temperature was raised to 45° C., with stirring, over a period of one hour, during which time 4 grams of crystalline pyridine sulfur trioxide was added and 15 ml. N sodium hydroxide was stirred in, dropwise, to maintain an alkaline system. The reaction mixture was stirred at 45° C. for three hours. When cooled to room temperature, the pH was 11.6 which was adjusted to pH 7.6 by the addition of 7.8 ml. of N hydrochloric acid.

The solution was extensively dialyzed against deionized water, concentrated and lyophilized.

Yield was 8.17 grams at 6.68 percent moisture content. Sulfur content was 2.51 percent, dry basis.

EXAMPLE 6

*Sulfation of corn gluten with trimethylamine sulfur trioxide in aqueous medium*

Corn gluten is the residue of corn grain endosperm after removing by wet milling, the hull and most of the fiber, nearly all of the starch and water soluble constituents. It contains a mixture of proteins with minor amounts of fat, pigment, starch, fiber and hemicellulose.

Corn gluten, containing 62.7 percent protein, was sulfated as follows: Eight grams was stirred into 100 ml. of 0.06 N sodium hydroxide. Vigorous stirring was continued while heating slowly to 50° C. over a period of 90 minutes. During this time, 3.5 grams of crystalline trimethylamine sulfur trioxide was added in small portions. The pH value was 11.5. The reaction mixture was allowed to cool to 25° C., with stirring over the next 4.5 hours whereupon the pH value was adjusted to 8.5 by the addition of 8.2 ml. of N hydrochloric acid.

A portion of the gluten remained insoluble during this treatment. The entire mixture was dialyzed extensively against deionized water.

The insoluble residue was removed by centrifuging and the clarified solution was concentrated and lyophilized to provide a dry sample for analysis.

Weight of product recovered=5.5 grams
Sulfur (by Parr bomb method)=4.90%, dry basis
Nitrogen (by Kjeldahl)=7.00%, dry basis The original gluten was analyzed, with results as follows:

Moisture=6.23%
Sulfur=0.97%, dry basis
Nitrogen=10.03%, dry basis

EXAMPLE 7

*Sulfation of zein with N,N-dimethyl benzylamine sulfur trioxide in aqueous medium*

Eight grams of commercial zein was sulfated in 100 ml. of N sodium hydroxide with 5.4 grams of N,N-dimethyl benzylamine sulfur trioxide according to the procedures outlined in Example 1.

The reaction mixture was adjusted to pH 2 with hydrochloric acid to hydrolyze any remaining sulfating agent and then adjusted to pH 7.4 with sodium hydroxide. The zein sulfate was precipitated substantially completely after the addition of as little as 5 grams of sodium sulfate.

The recovered product was soluble in water and in 50 percent by volume acetone in water.

A portion of the product was dissolved in water, dialyzed and the clear solution lyophilized to dryness. The product contained 3.1 percent sulfur.

EXAMPLE 8

*Use of sulfated protein as an adhesive*

An adhesive formulation was prepared by dissolving 37 parts of sulfated protein, as prepared in Example 4, in 100 parts of cold water. The resulting glue was a very light colored, clear, free flowing liquid. It was applied by a roll applicator to kraft paper in the manner of forming the side seams of a kraft paper bag. After drying, the glued seam of the kraft paper bag could not be pulled apart at the glue line; failure at the seam occurred only when sufficient force was applied to pull apart the paper fibers in the paper itself.

The above described adhesive formulation was applied with a film applicator to one side of strips of kraft paper and the prepared tape was dried. The adhesive surface was nontacky, was clear and had a very high gloss. The tape was then remoistened and applied, adhesive side down, to seal the edge of a corrugated paper board box. A very strong bond developed immediately and the tape could not be separated from the paper board at the glue line.

EXAMPLE 9

*Use of sulfated protein as a foaming or frothing agent*

A detergent composition was prepared consisting of essentially 5 parts of sodium hexametaphosphate and 0.75 part of sulfated protein, as prepared in Example 1, dissolved in 100 parts of water. When 75 ml. of this detergent composition was placed in a 125 ml. Erlenmeyer flask and shaken for 15 seconds, a copious foam formed which filled the flask. When allowed to stand, a large portion of the foam persisted for more than one hour; some foam persisted for more than 6 hours.

A second detergent composition prepared similarly but containing no sulfated protein, developed substantially no foam when shaken for 15 seconds in the manner above described.

EXAMPLE 10

*Use of sulfated protein as an emulsifying agent*

Five parts by weight of sulfated protein, as prepared in Example 1, was dissolved in 100 parts of water. While stirring with a motor driven glass paddle at 600 R. P. M., 250 parts by weight of refined cotton seed oil was added. Stirring was continued for 2 minutes after the addition of the oil to complete emulsification. The emulsion showed no sign of separation into its component liquid phases when stored in a glass jar for several days at room temperature.

When 100 parts by weight of water was stirred with 250 parts of refined cotton seed oil in the above described manner, a very temporary, crude emulsion formed which separated into the component liquid phases within about 3 minutes.

I claim:

1. A process for sulfating proteinaceous materials which comprises reacting a proteinaceous material in aqueous media with a tertiary amine sulfur trioxide compound, the pH of the system being maintained above about 7 and the temperature being within the range of about 25° C. to about 60° C. throughout the reaction.

2. Process according to claim 1 wherein said compound is trimethylamine sulfur trioxide.

3. Process according to claim 1 wherein said compound is triethylamine sulfur trioxide.

4. Process according to claim 1 wherein said compound is pyridine sulfur trioxide.

5. Process according to claim 1 wherein said compound is N,N-dimethyl benzylamine sulfur trioxide.

6. Process according to claim 1 wherein the sulfated protein is separated and recovered from the aqueous reaction liquors by the addition of an electrolyte.

7. A process for sulfating proteinaceous materials which comprises reacting a proteinaceous material in aqueous media with a tertiary amine sulfur trioxide compound, the pH of the system being maintained above about 7 and the temperature being within the range of about 25° C. to about 60° C. throughout the reaction.

8. Process according to claim 7 wherein the sulfated proteinaceous material is recovered by adding an electrolyte to the reaction medium to precipitate the sulfated proteinaceous material, and then separating the precipitated material.

References Cited in the file of this patent

UNITED STATES PATENTS

| | | |
|---|---|---|
| 1,835,841 | Beckett et al. | Dec. 8, 1931 |
| 2,344,267 | Reitz | Mar. 14, 1944 |
| 2,366,952 | Balls | Jan. 9, 1945 |
| 2,396,718 | Moscowitz | Mar. 19, 1946 |
| 2,402,647 | Lecher et al. | June 25, 1946 |
| 2,403,226 | Lecher et al. | July 2, 1946 |
| 2,433,831 | Auer | Jan. 6, 1948 |
| 2,486,921 | Byerly | Nov. 1, 1949 |
| 2,486,922 | Strain | Nov. 1, 1949 |
| 2,582,965 | Coffman | Jan. 22, 1952 |
| 2,697,093 | Jones | Dec. 14, 1954 |

OTHER REFERENCES

Reitz et al.: J. Am. Chem. Soc., vol. 68, pages 1024–35 (1946).